Jan. 19, 1965 H. H. KERN 3,166,088
WHEELED IRRIGATION PIPE MOVER
Filed May 24, 1962 2 Sheets-Sheet 2

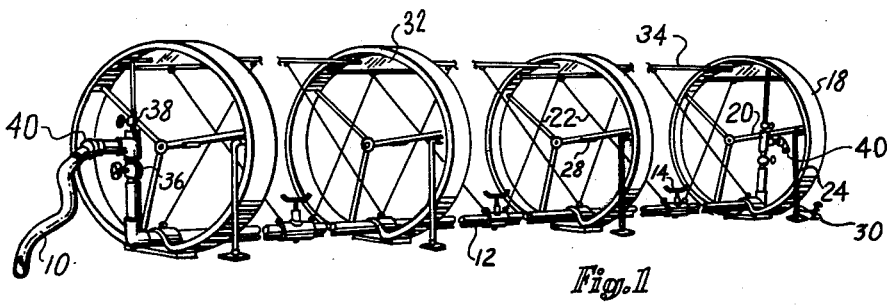
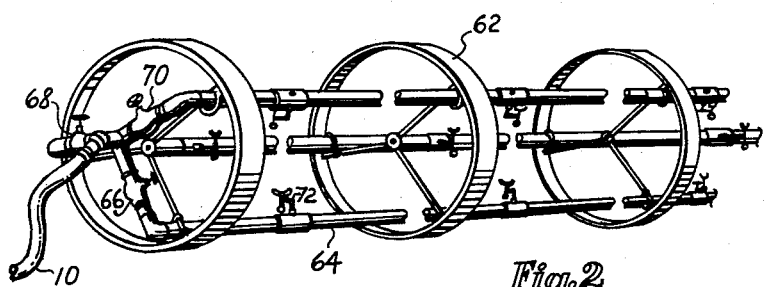
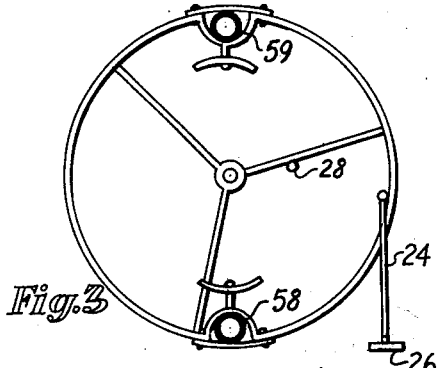
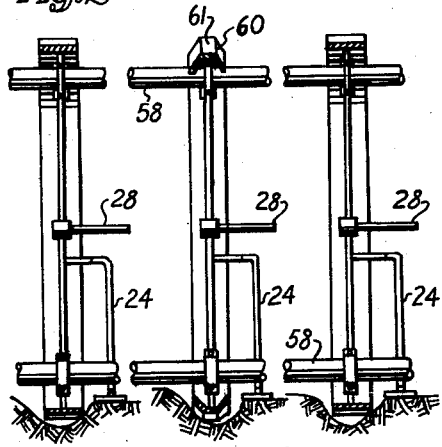
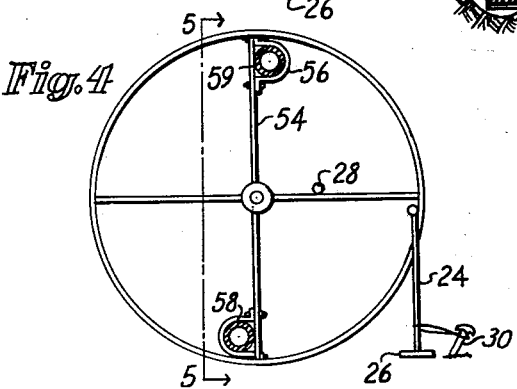
Hadley H. Kern
INVENTOR.

Hadley H. Kern
INVENTOR.
BY
Atty.

United States Patent Office 3,166,088
Patented Jan. 19, 1965

3,166,088
WHEELED IRRIGATION PIPE MOVER
Hadley H. Kern, Cochran County, Tex.
(Star Rte. 2, Morton, Tex)
Filed May 24, 1962, Ser. No. 197,337
11 Claims. (Cl. 137—344)

This invention relates to agricultural irrigation and more particularly to a system for moving sprinkler pipes from one location to another location in a field.

Much agricultural irrigation now is accomplished by laying aluminum pipes through a field and sprinkling therefrom. A major problem is to move the pipes from one location to another.

I have solved this problem of moving the pipe by attaching a plurality of wheels to the pipe. Attachment of the pipe is eccentric on the wheel. Therefore, the pipe will rotate the wheel to its lowest point if the pipe is full of water. Each wheel is counterbalanced so that the counterbalance is greater than the weight of the pipe without water. Therefore, if the pipe is empty and down; the wheels are unbalanced. Therefore, if they are started rolling in the right direction, they will roll to a point where the counterbalance is at the lowest point of the pipe. When the pipe is again filled with water, it is heavier than the counterbalance and it will continue the rotation of the pipe until the pipe is at the lowest point of the wheel at a new location and ready to start sprinkling at this new location.

An object of this invention is to move agricultural irrigation pipe from one location to another within a field.

Another object of this invention is to achieve the above without the use of auxiliary power equipment such as motors to move vehicles carrying the pipe.

Further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawing, the different views of which are not necessarily to the same scale, in which:

FIG. 1 is a perspective view of a system according to this invention.

FIG. 2 is a perspective view of a modified form of this invention.

FIG. 3 is a cross-sectional view of another embodiment.

FIG. 4 is a cross-sectional view of another embodiment.

FIG. 5 is an axial-sectional view of the embodiment shown in FIG. 4.

Referring specifically to FIG. 1, it may be seen that flexible conduit 10 is a source of water under pressure to the system. It will be understood that the flexible conduit 10 would be connected to a pipe or other means to have its own source of water under pressure.

The system itself includes an elongated pipe 12. The pipe 12 has on it a plurality of sprinklers 14 which form a means for discharging the water from the pipe 12.

Figure 8:
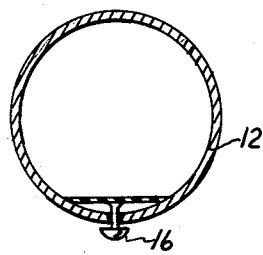
FIG. 8 is a cross-sectional view of a pipe showing the valve means for automatically draining water from the pipe.

Referring to FIG. 8 the pipe 12 will also have automatic valve means 16 for discharging water from the pipe if there is no pressure within the pipe. The valve means are shown in the open position. Pressure within the pipe will force the flexible valve means down, closing the pipe so that it is fluid tight. Such automatic valve means 16 are well-known to the art and are commercially available on the market.

A plurality of wheels 18 are connected or affixed to the pipe. The attachment of the pipe to the wheels 18 is eccentric of the axis of the wheel. As shown, the pipe 12 is approximately at the rim of the wheel. The wheel 18 has a plurality of spokes 20 for strength. Likewise, there are guy wires 22 which extend from the pipe 12 to the wheel 18 to provide reinforcement at these points.

Leg 24 is pivoted to each wheel 18 at the rim thereof about an axis parallel to the pipe 12 and parallel to the axis of the wheel 18. The leg 24 has a foot 26 at the bottom thereof so that it bears against the ground to prevent the wheel 18 from rotating it but one direction. A stop 28 is provided on one of the spokes 20 to prevent rotation of the leg 24 so that it would stop the wheel 18 from rotating in the desired direction. As may be seen in FIGS. 1 and 4 a stake 30 may be driven into the ground by which the leg 24 may be tied to the stake 30 to prevent movement of the wheel 18 in any direction. This is partly because when the system is empty, it is susceptible to being moved by the wind.

On the opposite side of the rim from which the pipe 12 is attached, there is a container 32 built onto each wheel 18. These containers 32 are connected by conduit 34 so that they may be filled with water. Each container 32 also contains an automatic valve means 16 for draining them when there is no pressure thereon. Valve 36 is in the connection from the flexible conduit 10 to the pipe 12. Valve 38 interconnects the flexible conduit 10 to the conduit 34. Connection 40 is for connecting the flexible conduit 10 to the pipe 12 and conduit 34 on the other end of the system so that either end might be connected to a source of water under pressure. Only one end need be connected at a time.

In operation the conduit valve 38 would be closed and the valve 36 would be open. Therefore, water would be discharged to the field through pipe 12 to irrigate. After the first area is watered sufficiently the valve 36 would be turned off allowing the pipe 12 to drain through the valves 16. The conduit valve 38 would be opened allowing each of the containers 32 to fill with water. The system would then be unstable inasmuch as the water in the containers 32 would be of greater weight than the empty pipe 12. Therefore, a slight manual shove on one of the wheels 18 would start the system rolling over. The torque from one wheel would be transmitted to the adjacent wheels by the pipe 12 and the conduit 34. When wheels 18 have made a half revolution, the conduit valve 38 would be closed. The containers 32 would drain as previously specified. Then the valve 36 would be opened allowing the pipe 12 to fill with water The system would again be unstable inasmuch as the pipe 12 full of water would be heavier than the conduit 34 and container 32 without the water therein. Again a slight manual shove on one of the wheels 18 would cause the system to rotate to the position shown in FIG. 1. Watering could then continue. When the system was again in the completely rotated position the legs 24 would pivot down into the position shown to prevent backward rotation of the wheels 18.

Each of the containers 32 could have a small weep hole therein so that they would discharge a certain amount of water all the time. This would eliminate the need for the automatic valve therein inasmuch as the conduit 34 would fill the containers 32 quicker than the water would seep out the weep holes.

Figure 7:
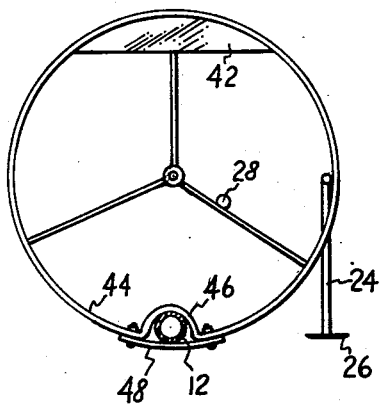
FIG. 7 is a cross-sectional view of yet another embodiment.

FIG. 7 illustrates one modification with counterbalance weight 42 attached to rim 44 of wheel 18 opposite pipe 12. The counter-balance weight 42 has a fixed mass which is greater than the pipe 12 empty of water, but less than the pipe 12 full of water. The operation would be basically the same. I.e., when the pipe 12 was full of water, it would be at the lowest point and would irrigate as described above. However, when it was empty, the system would be unstable because the weight of the counterbalance weight 42. But when the pipe 12 is on top, and full of water, the system would again be unstable because of the additional weight. FIG. 7 illustrates one manner in which the pipe 12 may be connected to rim 44 of the wheel 18. In this case the rim 44 has an inwardly curved portion 46 within which the pipe 12 fits. The pipe 12 is held in place by a strip 48 of the same radius or curvature as that of the rim 44. This method of attachment has the advantage that the pipe 12 may be placed against the rim 44 and strapped in place by the strap 48 without the necessity of running or threading the pipe 12 through the wheel 18. This method of attachment is also illustrated in FIG. 3.

Figure 6:
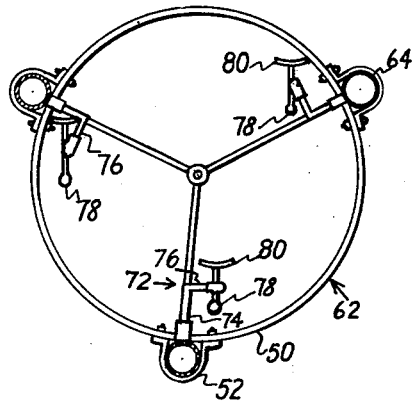
FIG. 6 is a cross-sectional view of another embodiment.

A modified form of attachment of the pipe to rim 50 of wheel 62 is illustrated in FIG. 6. In this illustration the rim 50 has the same curvature all the way around forming a circle. The pipes are strapped to the outside of the rim 50 by straps 52. Although the composite wheel is not circular on the outside, there is sufficient weight of water in the pipes to cause the wheel to rotate as described above even though it has somewhat a bumpy ride. The wheel 62 could be of even greater diameter with respect to the diameter of the pipe than as illustrated in FIG. 6.

FIG. 4 shows yet another manner in which the pipe could be attached to the wheel. In this instance the pipe is strapped to one of the wheel spokes 54 by strap 56.

In all the modifications of the attachment of the pipe to the wheel it will be seen that the pipe is attached eccentrically to the axis of the wheel.

Yet another modification is illustrated in FIGS. 3 and 4. In this modification a pair of pipes 58 and 59 of equal diameter are attached to each wheel. They are attached diametrically opposite. The lower pipe 58 would be full of water and sprinkling water upon the ground while the upper pipe 59 is empty. To move the system, the lower pipe 58 would be drained and the upper pipe 59 filled. This would cause each wheel to roll one-half revolution and watering would continue from this position. Then the positions would be reversed as to which was the watering pipe and which was the counter-balancing pipe.

FIG. 5 also illustrates the above modification in addition to another feature. One of the wheels has rim 61 with beveled sides 60. This is so that the wheel with the beveled rim 61 will be in the form of a furrow guide in a plowed field. In such case it is felt desirable that the pipes 58 and 59 be displaced from the rim 61 of the wheel so that the pipes 58 and 59 would be above the top of the bed of the plowed ground so that furrow guided wheel would be at the bottom of the furrow.

FIGS. 2 and 6 illustrate another embodiment. In this case each wheel 62 would have three pipes 64 attached thereto. Each of the pipes 64 would be an equal distance from the other two pipes 64 and also equally spaced from the axis of the wheel 62. Then if only one pipe 64 were full of water, it would be at the bottom of the system and watering. Then if valve 66 to the lower pipe 64 were closed and valve 68 of another pipe 64 open, the wheels 62 would rotate one-third revolution. Then the valve 68 could be closed and valve 70 opened to cause the system to revolve another one-third revolution. The system according to FIGS. 2 and 6 is adapted for automatic operation inasmuch as it is not necessary to manually start the system rolling. Also, each of the valves 66, 68, and 70 interconnect their respective pipes 64 to the flexible conduit 10.

Another means of operation is available with the system as shown in FIGS. 2 and 6. In this case two of the pipes 64 could be full of water and sprinkling at any one time. I.e., the valves 66 and 68 could be both open and watering while the valve 70 would be closed and the pipe connected to valve 70 would be on top. Then to move the system, the valve 66 is closed, causing the system to roll slightly toward the pipe of valve 68. After this initial rotation, the valve 70 is opened, completing the move. This system of operation is adapted to automatic operation with a timing mechanism to open and close the valves.

The above modified operation of the three pipe system necessitates having self-erecting sprinkler heads 72. Such sprinkler heads 72 are known to the art and are commercially available on the market and therefore will be briefly described. Each of them would have a riser section 74 extending from the pipe 64 axially toward the axis of the wheel 62. Nipple 76 extends from the extremity of riser 74. The sprinkler 80 would be free to rotate about the axis of the nipple 76. Counter-balance weight 78 maintains the sprinkler 80 in the upright position.

It will be apparent that in each case, the counterbalance weight is angularly spaced from the pipe. In some instances, this angular spacing is 120° as measured from the axis of the wheel where in other cases it is 180° measured at the axis of the wheel.

It will be apparent that the embodiments shown are only exemplary and that various modifications can be made in construction, materials, and arrangement within the scope of the invention as defined in the appended claims.

I claim as my invention:

1. A moveable agricultural irrigation system comprising:
   (a) an elongated pipe, and
   (b) a plurality of wheels,
   (c) said pipe affixed to each wheel in a fixed relationship to the wheel,
   (d) said pipe affixed eccentric to each wheel within the perimeter of the wheel,
   (e) said eccentricity being the same for each wheel.

2. The invention as defined in claim 1 with the addition of
   (f) a counterbalance weight affixed in a fixed position eccentrically to each wheel,
   (ff) the counterbalance weight being greater than the weight of the empty pipe such that if said pipe is at the lowest point and empty, the system is unstable.

3. The invention as defined in claim 2 wherein each counterbalance weight includes
   (g) a fixed mass of material attached to the rim of the wheel.

4. The invention as defined in claim 2 wherein each counterbalance weight includes
   (g) a conduit extending between the wheels.

5. The invention as defined in claim 4 wherein each counterbalance weight includes
   (h) a container attached to the wheel and
   (i) said conduit extending between the wheels being means for filling the container with liquid.

6. The invention as defined in claim 4 wherein the counterbalance weight includes
   (h) said conduit in the form of an additional pipe attached to each wheel.

7. The invention as defined in claim 1 with the addition of
   (g) a plurality of valve means for draining water from the pipe responsive to lack of pressure in the pipe.

8. The invention as defined in claim 1 with the addition of
   (f) a leg pivoted to the rim of each wheel forming means for limiting the rotation of the wheel to one direction only.

9. A moveable agricultural irrigation system comprising:
   (a) at least two elongated pipes,
   (b) a plurality of wheels,
   (c) each of said pipes attached in a fixed relationship to each of said wheels, (d) the said pipes attached eccentric to said wheels angularly spaced from each other,
(e) a flexible conduit,
(f) said conduit being a source of water pressure for said pipes,
(g) said flexible conduit connected to each of said pipes,
(h) a valve for each pipe connected between said flexible conduit and said pipe.
(i) each pipe adapted to contain a plurality of sprinklers for discharging water therefrom, and
(j) a plurality of valve means for draining water from each pipe located through the wall of the pipe,
(k) said valve means responsive to lack of pressure in the pipe.

10. A moveable agricultural irrigation system comprising:
(a) an elongated pipe, and
(b) a plurality of wheels,
(c) said pipe affixed to each wheel,
(d) said pipe affixed eccentric to each wheel,
(e) said eccentricity being the same for each wheel,
(f) a counterbalance weight on each wheel,
(g) each counterbalance weight including a conduit extending between the wheels,
(h) said conduit in the form of an additional pipe attached to each wheel,
(i) the attachment of the additional pipe eccentric of each wheel,
(j) said additional pipe attached to each wheel opposite the axis of each wheel from the first pipe,
(k) the additional pipe having the same diameter as the first pipe.

11. A movable agricultural irrigation system comprising:
(a) an elongated pipe, and
(b) a plurality of wheels,
(c) said pipe affixed to each wheel,
(d) said pipe affixed eccentric to each wheel,
(e) said eccentricity being the same for each wheel,
(f) a counterbalance weight on each wheel,
(g) each counterbalance weight including a conduit extending between the wheels,
(h) said conduit in the form of an additional pipe attached to each wheel,
(i) the attachment of the additional pipe eccentric of each wheel,
(j) a second additional pipe affixed to each wheel,
(k) the three pipes having the same diameter,
(l) each of the three pipes an equal distance from the other two pipes, and
(m) the three pipes an equal distance from the axis of the wheel.

References Cited in the file of this patent
UNITED STATES PATENTS

| | | |
|---|---|---|
| 1,085,609 | Heath | Feb. 3, 1914 |
| 2,741,510 | McCulloch | Apr. 10, 1956 |
| 2,766,996 | Jacoby | Oct. 16, 1956 |
| 2,807,500 | Clayton | Sept. 24, 1957 |
| 2,892,466 | Stilwell et al. | June 30, 1959 |
| 3,009,646 | Purtell | Nov. 21, 1961 |